Sept. 29, 1936.　　　R. E. McDOWELL　　　2,056,013
ANIMAL RESTRAINING DEVICE
Filed Feb. 27, 1935
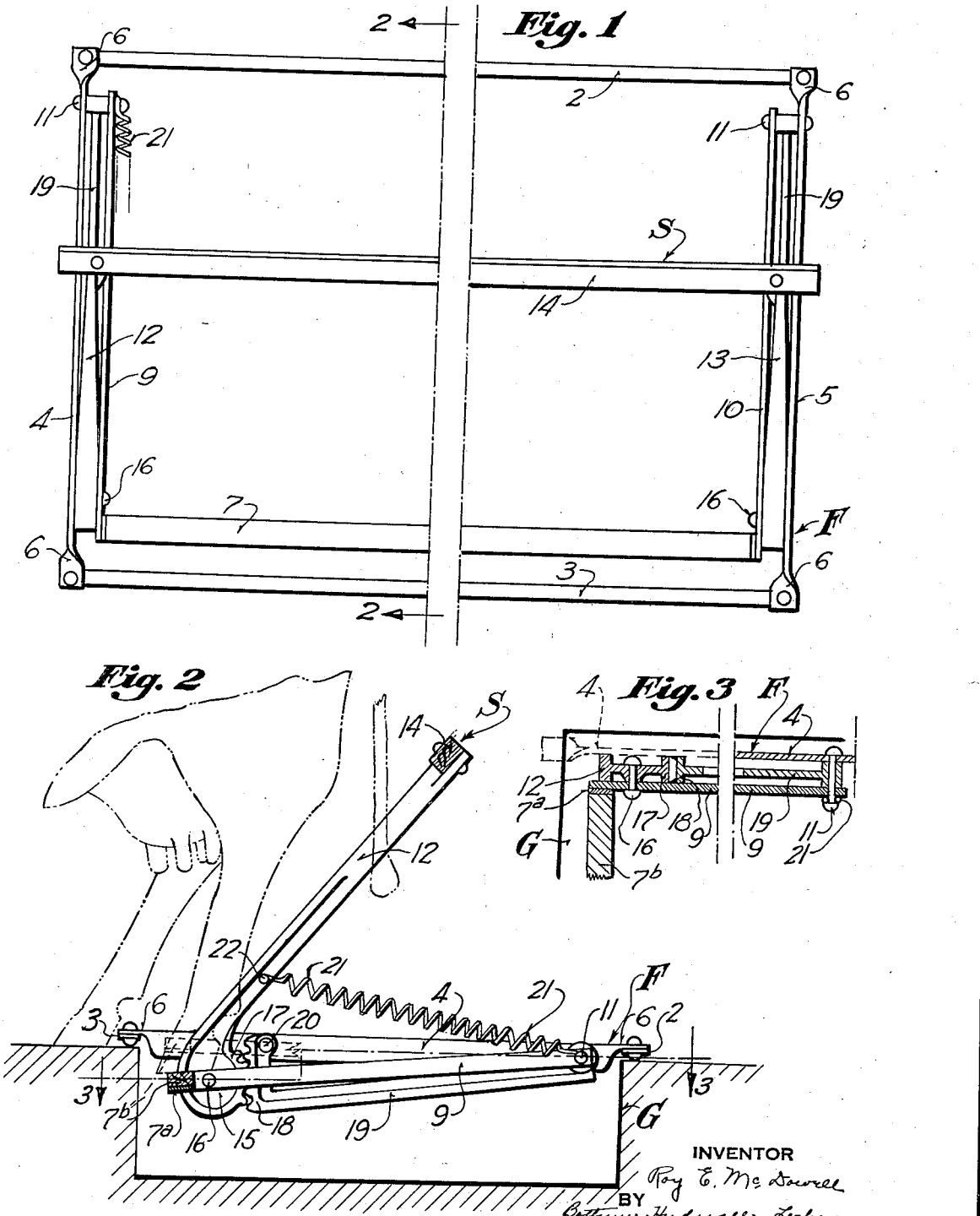

Patented Sept. 29, 1936

2,056,013

UNITED STATES PATENT OFFICE 2,056,013

ANIMAL RESTRAINING DEVICE

Roy E. McDowell, Waukesha, Wis.

Application February 27, 1935, Serial No. 8,444

5 Claims. (Cl. 119—15)

This invention relates to a device for preventing animals standing with their hind hoofs or feet in the gutter usually provided along the entrances to a row of animal stalls. Such a stall and gutter arrangement is frequently found in the barns which dairy farmers use for sheltering their cows.

Some cows acquire the bad habit of backing out of their stalls to such extent that they stand with their hind feet in the gutter with the result that their hind feet become soiled and contaminated and afterwards, when the animal lies down, their udders rest on or touch their hind feet and likewise become dirty and unsanitary. This is bad for the animal and also for the dairy farmer and especially so if his market for his milk is a large metropolitan district which has rigid standards and regularly checks the conditions under which their milk supply is produced.

The object of the present invention is to provide a simple, practical and comparatively inexpensive device which may be used when necessary to prevent a cow from standing with her hind feet in the gutter adjoining her stall and to do this in such a manner as to train the animal out of such a bad habit and this, of course, without injuring the animal. The device, while amply strong and durable, is readily portable and may be conveniently associated with or removed from the portion of the gutter alined with the entrance to any particular stall.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a fragmentary plan view showing a device embodying the present invention;

Figure 2 is a view in transverse vertical section taken on line 2—2 of Figure 1 and illustrating the device in position over a gutter; and Figure 3 is a fragmentary view in section taken on line 3—3 of Figure 2.

Referring to the drawing, it will be seen that the invention proposes a frame designated generally at F and made up of side bars 2 and 3 and cross bars 4 and 5. These frame members are preferably constituted of strap iron. The cross bars 4 and 5 are twisted adjacent their ends as indicated at 6 for the purpose of strengthening the structure and yet permitting the frame when in use to rest flatly against the margins of the gutter G, in which position the frame spans the gutter. The members of the frame may be welded, riveted or otherwise suitably secured together.

Adjacent the side bar 3 of the frame, which, in use, is positioned on the stall side of the gutter, a depressible platform 7 is provided and preferably consists of a bar-like structure having a metal strip 7ª and a wood strip 7ᵇ. This platform is secured to end portions of links 9 and 10, the opposite end portions of which are pivotally mounted as indicated at 11 on the side bars 4 and 5 of the frame.

A U-shaped striker designated generally at S is provided and consists of side arms 12 and 13 and a striking rail 14 extending transversely between and fastened to the outer ends of the side arms 12 and 13. The inner end portions of these side arms are enlarged as indicated at 15 (see Figure 2) and they are pivotally connected as at 16 with the links 9 and 10 adjacent the bar-like platform 7.

The enlarged portions 15 of the side arms 12 of the striker are provided with gear segments 17 which mesh with fixed gear segments 18 formed on brackets 19 which are fastened to the cross bars 4 and 5 of the main frame. As shown in Figure 2 the forward portion of each bracket is riveted or otherwise suitably secured as at 20 to its cross bar while the rear end thereof is held in position by the same bolts which provide the pivots 11 for the links 9 and 10. A rectractile coil spring 21 is provided and has one end connected as at 22 to one of the side arms of the striker and has its other end suitably anchored on the frame. One of the pivots 11 may be employed as the anchoring point. This spring is tensioned to return the striker to its lower inoperative position.

In use, the device is placed in position spanning the gutter G at a point opposite the entrance to a stall, as illustrated diagrammatically in Figure 2. When in such position, if a cow or other animal in the stall attempts to back out of the stall and stand with its hind feet in the gutter it will step on the bar 7 and the weight of the animal will depress the bar. This swings the links 9 and 10 downwardly and such movement of the links carries the pivotal connection 16 between the links and the side arms of the striker downwardly. This movement of the pivotal connection 16 causes the gears 17 and 18 to coact to swing the striker quickly upwardly until its striking rail 14 hits the backs of the hind legs of the animal a rather sharp blow sufficient to cause the animal to move back into the stall but not hard enough to do any physical injury.

It will be understood that the device is readily portable and may be used only when needed and only to correct animals who have acquired or are tending to acquire the bad habit of backing out of the stalls and standing with their hind feet in the gutter. In this way the animal is not only prevented from contaminating its feet and eventually contaminating the milk, if the animal be a cow, but is corrected of this habit.

While I have shown and described one construction in which the invention may be advantageously embodied, it is to be understood that this construction has been selected merely for the sake of illustration or example and that various changes in the size, shape and arrangement of the parts may be made without departing from the spirit of the invention or the scope of the subjoined claims.

The invention claimed is:

1. A striking barrier for gutters adjacent animal stalls comprising a horizontally disposed frame adapted to span the gutter, a depressible bar located within the confines of the frame adjacent the stall side of the gutter, links pivotally supported on the frame and connected to said bar, a striker having side arms pivotally connected to said links and having a cross rail connecting said side arms, and cooperating gears on said arms and said frame for causing said striker to swing upwardly and toward the stall when the links are moved downwardly with said depressible bar.

2. A device of the character described comprising a rectangular frame having side bars adapted to rest upon the margins of a gutter, cross bars connecting the ends of the side bars and extending transversely of said gutter, a longitudinal bar overlying the gutter and paralleling the side bar of the frame located on the stall side of the gutter, links pivotally mounted on said frame and secured to said bar, a U-shaped striker having its side arms pivotally interconnected with said links and provided with gear segments adjacent said pivotal connections and cooperating gear segments fixed to the cross bars of the frame and intermeshing with said first-named segments, whereby said striker will be swung upon depression of said longitudinal bar.

3. A portable restraining device for preventing animals from standing in gutters adjacent animal stalls and comprising a horizontally disposed frame adapted to span and overlie the gutter and to be supported by the margins thereof, a depressible platform disposed adjacent the stall side of said frame and adapted to be depressed when an animal steps thereon in backing out of the stall toward the gutter, a swingable striker having a transverse rail adapted to strike the backs of the legs of the animal when actuated, and gearing actuated upon depression of the platform to cause actuation of the striker, said platform, said striker and said gearing being supported by said frame and being positioned at all times above and in spaced relation to the bottom of the gutter.

4. A portable restraining device for preventing animals from standing in gutters adjacent animal stalls and comprising a frame adapted to overlie the gutter and to be supported by the margins thereof, a depressible platform disposed adjacent the stall side of said frame and adapted to be depressed when an animal steps thereon in backing out of the stall toward the gutter, a swingable striker having side arms pivotally interconnected with said platform and having a transverse rail connecting said arms, and gearing coacting with said arms to cause the rail of the striker to swing against the backs of the legs of the animal when the platform is depressed.

5. A device of the character described comprising a frame adapted to rest upon the margins of a gutter, a longitudinal bar overlying the gutter on the stall side, links pivotally mounted on said frame and secured to said bar, a U-shaped striker having its side arms pivotally interconnected with said links and provided with gear segments adjacent said pivotal connections and cooperating gear segments fixed to the frame and intermeshing with said first-named segments, whereby said striker will be swung upon depression of said longitudinal bar.

ROY E. McDOWELL.